United States Patent
Pratt et al.

(10) Patent No.: US 11,295,021 B2
(45) Date of Patent: *Apr. 5, 2022

(54) USING A THREAT MODEL TO MONITOR HOST EXECUTION IN A VIRTUALIZED ENVIRONMENT

(71) Applicant: HEWLETT-PACKARD DEVELOPMENT COMPANY, L.P., Spring, TX (US)

(72) Inventors: Ian Pratt, Cambridge (GB); Rahul Kashyap, Foster City, CA (US); Adrian Taylor, Cambridge (GB); James McKenzie, Cambridge (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,227

(22) Filed: Sep. 18, 2019

(65) Prior Publication Data
US 2020/0327236 A1    Oct. 15, 2020

Related U.S. Application Data

(63) Continuation of application No. 15/714,100, filed on Sep. 25, 2017, now Pat. No. 10,430,591.
(Continued)

(51) Int. Cl.
*G06F 21/57*    (2013.01)
*G06F 21/55*    (2013.01)
(Continued)

(52) U.S. Cl.
CPC ........ *G06F 21/577* (2013.01); *G06F 9/45558* (2013.01); *G06F 21/552* (2013.01);
(Continued)

(58) Field of Classification Search
CPC .... G06F 21/577; G06F 21/552; G06F 21/554; G06F 21/56; G06F 2009/45587; H04L 63/1416; H04L 63/1433
(Continued)

(56) References Cited

U.S. PATENT DOCUMENTS 7,664,626 B1 *  2/2010  Ferrie ..................... G06F 9/455
                                                       703/23
8,074,115 B2  12/2011  Stolfo et al.
(Continued)

OTHER PUBLICATIONS

Park, Sean. "Malware expert: Execution tracking." 2012 Third Cybercrime and Trustworthy Computing Workshop. IEEE, 2012. (Year: 2012).*

(Continued)

*Primary Examiner* — Syed A Zaidi
(74) *Attorney, Agent, or Firm* — HPI Patent Department

(57) ABSTRACT

Approaches for monitoring a host operating system. A threat model is stored and maintained in an isolated execution environment. The threat model identifies for any process executing on a host operating system how trustworthy the process should be deemed based on a pattern of observed behavior. The execution of the process and those processes in a monitoring circle relationship thereto are monitored. The monitoring circle relationship includes a parent process, any process in communication with a member of monitoring circle relationship, and any process instantiated by a present member of monitoring circle relationship. Observed process behavior is correlated with the threat model. Upon determining that a particular process has behaved in a manner inconsistent with a pattern of allowable behavior identified by the threat model for that process, a responsive action is taken.

20 Claims, 4 Drawing Sheets

Related U.S. Application Data

(60) Provisional application No. 62/404,127, filed on Oct. 4, 2016.

(51) Int. Cl.
*H04L 29/06* (2006.01)
*G06F 9/455* (2018.01)
*G06F 21/56* (2013.01)

(52) U.S. Cl.
CPC ........ *G06F 21/554* (2013.01); *H04L 63/1416* (2013.01); *G06F 21/56* (2013.01); *G06F 2009/45587* (2013.01); *H04L 63/1433* (2013.01)

(58) Field of Classification Search
USPC .......................................................... 726/25
See application file for complete search history.

(56) References Cited

U.S. PATENT DOCUMENTS

| | | | | |
|---|---|---|---|---|
| 8,104,090 B1* | 1/2012 | Pavlyushchik | .......... | G06F 21/56 726/24 |
| 8,135,994 B2 | 3/2012 | Keromytis et al. | | |
| 8,220,054 B1 | 7/2012 | Lu | | |
| 8,713,631 B1* | 4/2014 | Pavlyushchik | ....... | G06F 21/566 726/1 |
| 8,935,779 B2* | 1/2015 | Manni | .................... | G06F 21/567 726/22 |
| 9,092,625 B1* | 7/2015 | Kashyap | ............. | G06F 9/45558 |
| 2002/0055826 A1 | 5/2002 | Wegerich et al. | | |
| 2005/0172297 A1 | 8/2005 | Garcia | | |
| 2009/0271867 A1* | 10/2009 | Zhang | .................... | G06F 21/566 726/24 |
| 2009/0288161 A1 | 11/2009 | Wei et al. | | |
| 2010/0138189 A1 | 6/2010 | Reichert et al. | | |
| 2011/0047597 A1 | 2/2011 | Mahaffey et al. | | |
| 2011/0078794 A1* | 3/2011 | Manni | .................... | G06F 21/566 726/23 |
| 2011/0145920 A1 | 6/2011 | Mahaffey et al. | | |
| 2011/0296412 A1* | 12/2011 | Banga | .................... | G06F 9/5077 718/1 |
| 2012/0072987 A1* | 3/2012 | Koelle | ................ | H04L 63/1425 726/23 |
| 2012/0079596 A1* | 3/2012 | Thomas | ................ | G06F 21/566 726/24 |
| 2012/0110174 A1 | 5/2012 | Wootton et al. | | |
| 2012/0278895 A1 | 11/2012 | Morris et al. | | |
| 2013/0047039 A1 | 2/2013 | Manes et al. | | |
| 2013/0055256 A1 | 2/2013 | Banga et al. | | |
| 2013/0073601 A1* | 3/2013 | Jenkins | .................... | G06F 9/547 709/201 |
| 2013/0305368 A1 | 11/2013 | Ford | | |
| 2014/0351810 A1* | 11/2014 | Pratt | .................... | G06F 9/45545 718/1 |
| 2015/0188933 A1 | 7/2015 | Zeitlin et al. | | |
| 2015/0220735 A1* | 8/2015 | Paithane | ................ | G06F 21/53 726/23 |

OTHER PUBLICATIONS

NPL Search Terms (Year: 2020).*
NPL Search Terms (Year: 2021).*
NPL Search Terms (Year: 2022).*
Amsden, Nathaniel, and Cihan Varol. "Malware Detection from a Virtual Machine." International Journal of Computer and Information Technology 2.6 (2013): 1029-1034 (Year: 2013).*
Ma et al., "Shadow attacks: automatically evading system-call-behavior based malware detection", Journal in Computer Virology, 2012, 12 pages.
Srinivasan et al., "Process Out-Grafting: An Efficient "Out-of-VM" Approach for Fine-Grained Process Execution Monitoring", In Proceedings of the 18th ACM conference on Computerand communications security (CCS '11). ACM, 2011, pp. 363-374.
Wu et al., "Droidmat: Android Malware Detection through Manifest and API calls Tracing", 2012 Seventh Asia Joint Conference on Information Security. IEEE, 2012, pp. 62-69.

* cited by examiner

USING A THREAT MODEL TO MONITOR HOST EXECUTION IN A VIRTUALIZED ENVIRONMENT

CLAIM OF PRIORITY

This application is a continuation application, and claims priority to, U.S. non-provisional patent application Ser. No. 15/714,100, entitled "Using Threat Model to Monitor Host Execution in a Virtualized Environment," filed on Sep. 25, 2017, the entire contents of which are hereby incorporated by reference for all purposes in their entirety as if fully set forth herein.

The parent application, U.S. non-provisional patent application Ser. No. 15/714,100, claims priority to U.S. Provisional Patent Application 62/404,127, entitled "Using Threat Model to Monitor Host Execution in a Virtualized Environment," filed on Oct. 4, 2016, the entire contents of which are hereby incorporated by reference for all purposes in their entirety as if fully set forth herein.

FIELD OF THE INVENTION

Embodiments of the invention relate to the monitoring of processes executing in a host operating system for observance of suspicious behavior.

BACKGROUND

A great deal of time, money, and effort is spent in the fight against security risks, such as viruses, malware, exploits, intrusions, and other dangers to enterprise computing. A malware infection may require a compromised system to be erased and re-imaged to remove the malware, which can also result in great expenditures of time and money as well as loss of productivity.

While terms such as viruses, malware, and exploits may have specific definitions in the art, as used herein the term "malware" shall refer to any type of computer code and/or other data introduced from outside a computer system or network of computers that may be used to damage or otherwise cause aspects of the computer system or network of computers to malfunction or perform in an unintended manner. Thus, as used herein, the term "malware" encompasses viruses, exploits, worms, and any type of programmatic security risk.

Malware may be introduced into a computer network through a wide variety of avenues, such as email or a malformed JPEG or other code on a web page that is downloaded to a computer via a web browser. Malware generally follows a common lifecycle; namely, the malware will exploit a weakness in the computer system or network, the malware will drop and execute a payload, the malware will attempt to escalate its privileges, the malware will take steps to persist on the system and/or network despite efforts to remove it, and finally the malware will propagate to other computers. If the malware is unable to be detected using current approaches, then countermeasures cannot be enacted and systems may become infected.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for monitoring the execution of a host operating system to ensure that all processes executing on the host operating system conform to specified behavioral norms are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Figure 1:
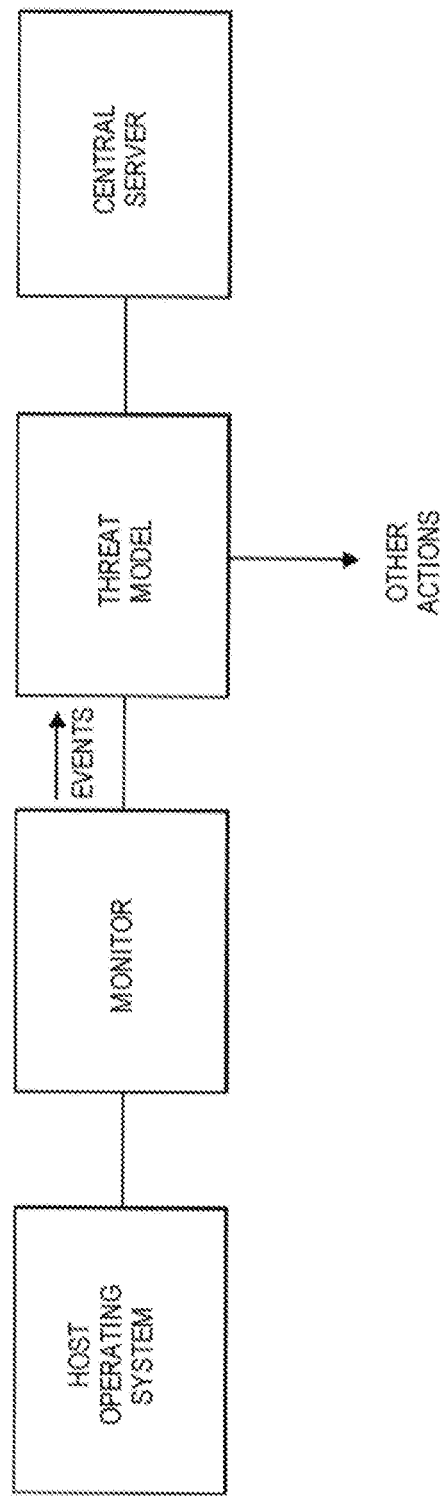
FIG. 1 a block diagram illustrating a flow of information according to an embodiment of the invention.

Approaches for monitoring the execution of a host operating system to ensure that its execution conforms to behavioral norms shall be discussed herein in relation to different embodiments. FIG. 1 a block diagram illustrating functional components of an embodiment of the invention. A monitor is a software component which observes execution of a host operating system. The monitor may execute external to the host operating system, e.g., from within a separate protected environment. The monitor may use introspection techniques for observing the behavior of the host operating system.

As a result of observing the host operating system, the monitor will generate a set of events which are supplied, either synchronously or periodically, as input to a threat model. The thread model is a software component that compares the received set of events against a model of expected or allowable behavior for executable code, interpreted data, and user actions. The events supplied to the threat model are correlated against the model to determine whether any process executing in the host operating system is behaving in a manner inconsistent with a pattern of allowable behavior identified by the threat model for that process. Upon determining that a process is behaving in an uncharacteristic or expected manner, the threat model may instruct that one or more of a plurality of responsive actions be taken, such as but not limited to notifying a central server, performing additional monitoring of host operating system activity, persistently storing a record of activity occurring within the host operating system, and blocking certain activity at the file and/or network level.

Approaches discussed herein also make use of monitoring circle relationships to ensure any processes related to a process being monitored are themselves monitored. A monitoring circle relationship is more inclusive than merely a parent child relationship, as a monitoring circle relationship includes the parent process to a process being monitored, any process in communication with a member of the monitoring circle relationship, and any process instantiated by a present member of the monitoring circle relationship. In this way, if a first process being monitored communicates with a second process, and the second process subsequently creates a child process, then the child process of the second process will be in a monitoring circle relationship with the first process under the policy rationale that the first process may have caused or influenced the second process to instantiate the child process, and so the child process should be monitored in conjunction with the first process for possible collusion.

System Overview

Figure 2:
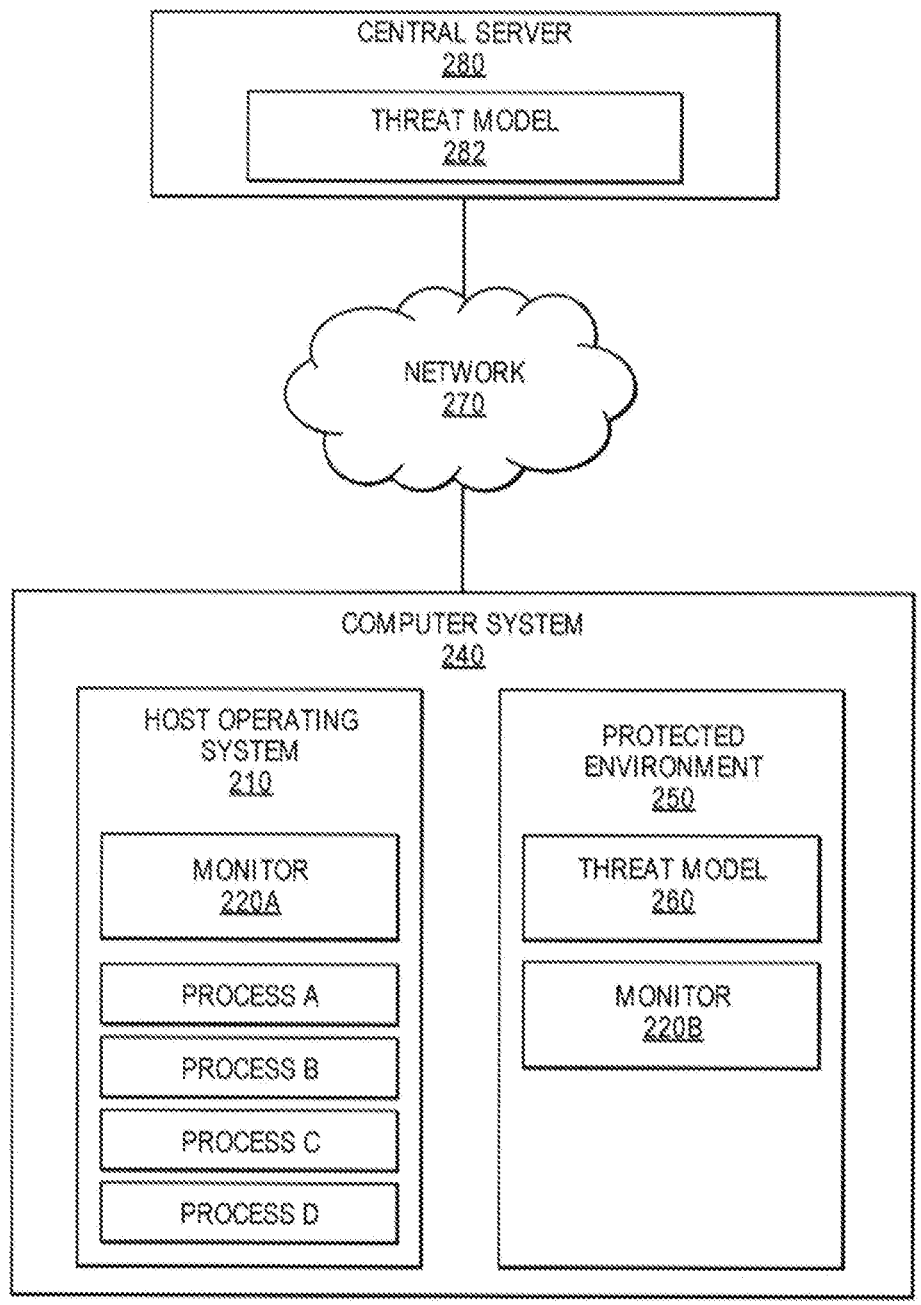
FIG. 2 is a block diagram of a system for monitoring the execution of processes in a host operating system for observance of suspicious behavior without the use of virtualization according to an embodiment of the invention.

FIG. 2 is a block diagram of a system for monitoring the execution of processes in a host operating system for observance of suspicious behavior according to an embodiment of the invention. The system of FIG. 2 includes a computer system 240, a network 270, and a central server 280.

Computer system 240, as broadly used herein, refers to any type of computer system capable of executing a host operating system 210. For example, computer system 240 may correspond to a personal computer (PC), a laptop computer, a tablet computer, a cell phone, a portable computing device, and the like. Computer system 240 may execute host operating system 210 and protected environment 250.

Host operating system 210 refers to the default operating system loaded by computer system 240 upon being powered on. Host operating system 210 may be any type of operating system, such as but not limited to a Windows operating system provided by Microsoft Corporation, OS X provided by Apple Corporation, and Android operating system developed by Google, Inc. A multitude of different processes may by executed by host operating system 210. Four such example processes executing in host operating system 210 are depicted in FIG. 2 as processes A, B, C, and D. Processes A, B, C, D shall be referred to below in the description of several examples of particular embodiments of the invention.

Monitor 220 is a software component which observes execution of a host operating system. As a result of observing host operating system 210, monitor 220 generates data describing a set of events (event data) which is supplied as input to threat model 260. Monitor 220 may be implemented as one or more of monitor 220A and 220B in FIG. 2.

In an embodiment, monitor 220A may be implemented by one or more drivers which do not appear on a list of drivers loaded by host operating system 210. In such an embodiment, if host operating system 210 were instructed to display a list of loaded drivers, then the drivers implementing monitor 220A would not appear the list of drivers loaded by host operating system 210. The motivation for rendering the drivers implementing monitor 220A incognito from a user perspective is dissuade any malicious users from tampering with or disabling monitor 220A.

Protected environment 250 may correspond to any type of isolated execution environment, such as but not limited to a virtual machine, a container, or a sandbox. According to one embodiment, protected environment 250 may be implemented using Intel® Software Guard Extensions (SGX) technology, which is a hardware feature which allows user-level code to allocate private regions of memory, called enclaves, that unlike normal process memory is also protected from processes running at higher privilege levels.

According to another embodiment, protected environment 250 may be implemented using an approach described by U.S. Pat. No. 9,021,476, granted Apr. 28, 2015, entitled "Ensuring the Privacy and Integrity of a Hypervisor," the entire disclosure of which is hereby incorporated by reference for all purposes as if fully set forth herein. U.S. Pat. No. 9,021,476 teaches an approach for preventing host operating system from accessing a portion of resources belonging to or allocated by a hypervisor (such as protected environment 250) to prevent host operating system 210 from violating the privacy and integrity of that portion of resources (i.e., protected environment 250). To do so, host operating system 210 is established in a container that lacks privilege to access any of the memory in which the hypervisor executes. Embodiments of the invention may implement protected environment using any combination of the above approaches, e.g., embodiments may implement protected environment using Intel® Software Guard Extensions (SGX) technology in addition to the approached of U.S. Pat. No. 9,021,476.

By its design, protected environment 250 is intended to represent and constitute a trusted execution environment, as any malware inadvertently introduced into host operating system 210 should not be able to impact or interfere with the privacy and integrity of protected environment 250. For this reason, certain embodiments may choose to implement monitor 220 in protected environment 250 rather than host operating system 210, e.g., for example, monitor 220B is depicted in FIG. 2 as executing in protected environment 250. Monitor 220B, in executing in protected environment 250, may employ introspection to observe the activity within host operating system 210. In an embodiment, protected environment 250 is tamper-resistant by virtue of protected environment 250 being hardware-attested.

Note that certain embodiments may only implement either monitor 220A executing on host operating system 210 or monitor 220B executing in protected environment 250. However, certain embodiments may choose to implement both monitor 220A and 220B so that monitor 220A and monitor 220B are performing redundant or complimentary observations. For example, certain embodiments may employ monitor 220A and 220B on the same computer system so that monitor 220B is chiefly or exclusively responsible for monitoring the presence of monitor 220A executing in host operating system 210 and to ensure that monitor 220A has not been tampered with and is functioning normally.

As protected environment 250 is intended to represent and constitute a trusted execution environment, threat model 260 may be implemented within protected environment 250 by an embodiment. Threat model 260 is a software component that models expected or allowable behavior of executable code, interpreted data, and user actions. Threat model 260 receives event data from monitor 220 (either from monitor 220A and/or monitor 220B as explained above) and correlates the event data to determine whether any process executing in host operating system 210 is behaving in a manner inconsistent with a pattern of allowable behavior identified by threat model 260 for that process. Threat model 260 may perform or instruct a plurality of responsive actions if a particular process is determined to be behaving outside of behavioral norms modeled by threat model 260.

Threat model 260 may define a set of allowable behavior for processes having certain characteristics while executing in host operating system 210. The set of allowable behavior for the particular process may be based, at least in part, upon characteristics inherited from the parent process and other members of a monitoring circle relationship. Embodiments of the invention may implement threat model 260 using techniques discussed in U.S. Pat. No. 9,223,962, entitled "Micro-Virtual Machine Forensics and Detection," invented by Rahul C. Kashyap et al., the contents of which are hereby incorporated by reference for all purposes as if fully set forth herein. Embodiments of the invention may implement threat model 260 using techniques discussed in U.S. Pat. No. 9,092,625, entitled "Micro-Virtual Machine Forensics and Detection," invented by Rahul C. Kashyap et al., the contents of which are hereby incorporated by reference for all purposes as if fully set forth herein. Embodiments of the invention may implement threat model 260 using techniques discussed in U.S. patent application Ser. No. 14/809,014, entitled "Micro-Virtual Machine Forensics and Detection," invented by Rahul C. Kashyap et al., the contents of which are hereby incorporated by reference for all purposes as if fully set forth herein.

Network 270 represents any type of private or public computer network, such as for example the Internet.

Central server 280 represents a computer system accessible over network 270 by computer system 240 in FIG. 2. An instance of threat model 260 may also be executed at central server 280, as represented by threat model 282 in FIG. 2. Embodiments of the invention may implement central server 280 using techniques discussed in US Patent 9,203,862, entitled "Centralized Storage and Management of Malware Manifests," invented by Rahul C. Kashyap et al., the contents of which are hereby incorporated by reference for all purposes as if fully set forth herein.

Monitoring Process Execution in the Host Operating System

Figure 3:
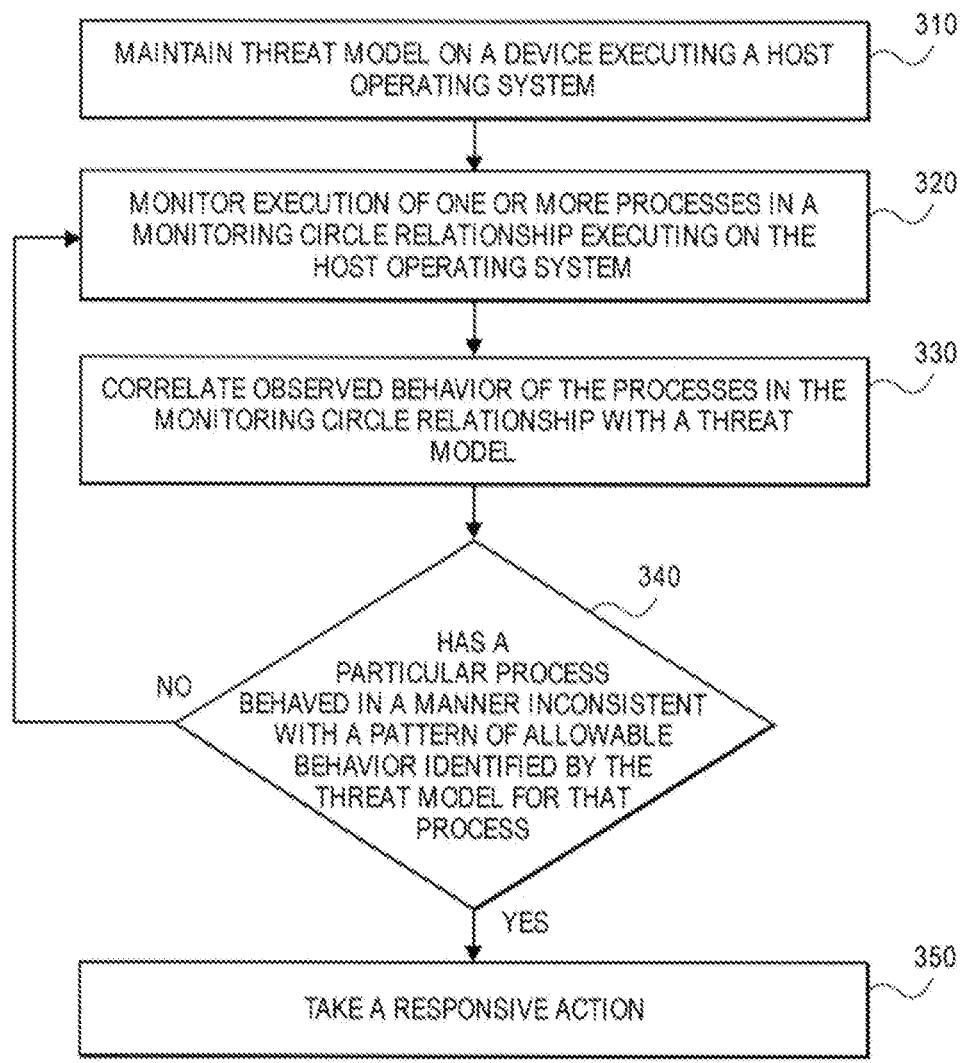
FIG. 3 is a flowchart of the steps of monitoring the execution of processes in a host operating system according to an embodiment of the invention.

FIG. 3 is a flowchart of the steps of monitoring the execution of processes in a host operating system according to an embodiment of the invention. The steps of FIG. 3 will be explained below with reference to the embodiment depicted in FIG. 2.

The steps of FIG. 3 presume that a monitor 220 is executing upon a computer system comprising a host operating system; however, in the description of FIG. 3, unless otherwise specified, monitor 220 may refer to either monitor 220A (executing in host operating system 210) or monitor 220B (executing in protected environment 250).

In step 310, threat model 260 is maintained on a computer system 240 which executing a host operating system. In doing so, threat model 260 may be implemented such that it executes within host operating system 210 or within protected environment 250 (as shown in FIG. 2).

In step 320, monitor 220 observes the execution and behavior of a plurality of processes executing in host operating system 210. Event data that describes the events observed by monitor 220 is sent from monitor 220 to threat model 260. In an embodiment, upon monitor 220 determining that a first process not being observed is in a monitoring circle relationship with a second process already being monitored, then the first process will become observed by monitor 220 in conjunction with the second process by virtue of the first process being in a monitoring circle relationship with the second process.

A parent process is in a monitoring circle relationship with a child process. For example, if process A is a parent process of process B by virtue of process A initiating the execution of process B, then process A and B are in a monitoring circle relationship. Any process that communicates or interacts with a member of a monitoring circle relationship becomes, as a result, a member of that monitoring circle relationship. Continuing with this example, if process B subsequently communicates with process C, then process A, B, and C are in a monitoring circle relationship. Any process instantiated by a present member of the monitoring circle relationship also joins the monitoring circle relationship. In continuance of this example, if process C initiates the execution of process D, then processes A, B, C, and D are in the monitoring circle relationship. The policy rationale for process D joining the monitoring circle relationship is that process B, in communicating with process C, may have caused or influenced the process C to instantiate process D, and so process D should be monitored in conjunction with process B for possible collusion.

Step 320 may be performed by monitor 220A by monitor 220A directly observing the execution of a plurality of processes executing in host operating system 210. Step 320 may also be performed by monitor 220B observing the execution of a plurality of processes executing in host operating system 210 via introspection. As a result of observing host operating system 210, monitor 220 will generate a set of events which are supplied as input to threat model 260.

In the performance of step 320, monitor 220 may observe all network traffic entering or exiting host operating system 210 for purposes of ensuring all processes are behaving as expected.

Monitor 220 may, in step 320, inspect any and all data structures within or maintained by host operating system 210 to affirm what processes are executing, what data is being stored, and to ensure that host operating system 210 is behaving as expected. Such data structures observed by monitor 220 may be stored on disk or in RAM. In this way, monitor 220 may affirm that security software is executing as expected in host operating system 210, may monitor the actual code of the security software to ensure that the security software code has not been tampered with or otherwise disturbed, and may ensure that security software executing on host operating system 210 is receiving an opportunity to execute on the CPU periodically by inspecting kernel data structures and/or by inspecting the memory used by such security software.

Monitor 220 may, in step 320, observe and confirm the regular receipt of heart beat or "I'm alive" messages sent from software executing in host operating system 210 for purposes of ensuring that software has not been removed or disabled.

Embodiments, in the performance of step 320, may maintain communication with other devices on network 270 even if the networking capabilities of host operating system 210 has been compromised or disabled. This particular embodiment may be particularly suited when computer system 240 one physical network card which is under the control of protected environment 250. Protected environment 250 may, in turn, expose a virtual network card to host operating system 210 so that host operating system 210 is unaware that protected environment 250 has control of the physical network card of computer system 240. As protected environment 250 may send and receive data via the physical network card of computer system 240 without the consent or involvement of host operating system 210, protected environment 250 may communicate over network 270 without impact if host operating system 210 is compromised or is not operational. In this way, any data sent from host operating system 210 to central server 280 concerning the behavior of host operating system 210 may be performed uninterrupted irrespective of the operational status of host operating system 210.

In such an embodiment, host operating system 210 maintains control of a network card used to communicate over network 270. In such an embodiment, protected environment 250 may communicate over network 270, potentially with central server 280, vis-a-vis host operating system 210. To do so, protected environment 250 may sign and encrypt all communications data and send the signed and encrypted communications data to host operating system 210 to permit host operating system 210 to send the signed and encrypted communications data over network 270 to a remote destination, such as central server 280. While this embodiment is vulnerable to ceasing network communications over network 270 in response to a denial of service attack targeting host operating system 210 or host operating system crashing, the encryption of communication data by protected environment 250 would preserve the privacy of such communications and prevent host operating system 210 from having access to the encrypted communications. Further, by protected environment 250 signed the communications data, the recipient can ensure that the communications did indeed originate from protected environment 250 even though they were sent by host operating system 210, which in this embodiment, is vulnerable to compromise.

In certain embodiments, monitor 220 may observe and record read accesses or write accesses to certain files or areas of a persistent storage medium and may observe and record read access or write access to certain areas of the registry or other repositories of other settings.

Embodiments of the invention may also, in performing step 320, inspect data structures maintained by or within host operating system 210 (such data structures may be persistently stored on disk or other persistent storage medium or may be maintained in RAM or other volatile memory) to affirm what processes and applications are executing and what data is being stored and maintained to ensure that host operating system 210 is undergoing normal activity. In this way, an embodiment may ensure that security software or other software designed to combat or address malicious code is executing properly within host operating system 210. By examining the processes executing with host operating system 210 and the data maintained in RAM and persistently stored on disk, embodiments may ensure that any software executing in host operating system 210, such as security software or other software designed to combat or address malicious code, has not been tampered with.

Embodiments of the invention may also, in performing step 320, ensure regular receipt of a heartbeat message, which is a message sent from a software process periodically to evidence that it is executing as intended, to ensure software has not been tampered with or otherwise disabled.

Embodiments of the invention may also, in performing step 320, monitor and record all network traffic entering and exiting host operating system 210.

Embodiments of the invention may also, in performing step 320, inspect kernel data structures of host operating system 210 or inspect memory used by security software or other software designed to combat or address malicious code to ensure that such software is being provided access to a CPU so that it may execute periodically by a CPU.

Note that monitor 220B may continue to operate to monitor activity concerning host operating system 210 in step 320 even if host operating system 210 has crashed, has been erased, and/or has been reinstalled.

In step 330, information describing the observations made by monitor 220 is correlated with threat model 260. In doing so, the observed behavior of processes in any monitoring circle relationship would be correlated with threat model 260. The model employed by threat model 260 is designed to identify abnormal behavior across a variety of considerations. In this way, threat model 260 may function to selectively determine what events occurring in host operating system 210 are important or worthy of further consideration and/or responsive action.

Threat model 260 may be designed to model expected or allowable behavior of executable code, interpreted data, and user actions. Any sequence of events performed, caused, or associated with a single process or a plurality of processes in a monitoring circle relationship which deviates from the expected or allowable behavior for that process or collection of processes may be considered inconsistent with a pattern of allowable behavior as defined by threat model 260.

In certain embodiments, in performing step 230, the binary data of files may be analyzed to determine whether the files appear to be packed or encrypted or show other evidence of being malicious.

In certain embodiments, in performing step 230, suspicious patterns of network activity involving host operating system 210 may be identified by monitoring and recording all network activity, whether suspicious or otherwise, and therefore analyzing the network activity for patterns of suspicious behavior. Further, certain embodiments may query repositories located over network 270 to obtain knowledge about malicious behavior of certain files to determine if there is any evidence of such files inhabiting computer system 240. As an example, an embodiment might query a repository of known malicious programs and malware using a hash of a binary file that is stored by host operating system 210 to ascertain whether the file is known to be malicious.

In step 340, a determination is made as to whether, as a result of performing step 330, a particular process being observed has behaved in a manner inconsistent with a pattern of allowable behavior as identified by threat model 260. If this result is negative, then processing proceeds to step 320 so that all processes executing in host operating system 210 are continually monitored and observed.

On the other hand, upon determining that a particular process being observed has behaved in a manner inconsistent with a pattern of allowable behavior, then in step 350 a responsive action is taken. Embodiments may be configured to perform a variety of different responsive actions. The following description of responsive actions is by no means mutually exclusive, as embodiments may choose to perform any number of the following responsive actions based on a case by case basis. Further, different thresholds may be set such that the magnitude of the responsive action is proportional to the level of observed suspicious behavior.

Potential Responsive Actions Initiated by the Threat Model

One potential responsive action which may be taken in step 350 is that central server 280 may be notified that a particular process in host operating system 210 on computer system 240 has been observed behaving in a manner inconsistent with a pattern of allowable behavior. Embodiments may provide central server 280 with information describing the behavior of the observed particular process as well as any process in a monitoring circle relationship with that particular process. For example, an embodiment may transmit, from computer system 240 to central server 280 over network 270, event data that identifies the events caused by the particular process to central server 280. Such event data may be, but need not be, expressed as one or more XML documents. In this fashion, central server 280 may receive event data from a plurality of computer systems.

In an embodiment, event data may include a record of when host operating system 210 executes instructions located at certain memory locations. In the event that host operating system 210 does execute instructions located at certain memory locations, additional monitoring and/or responsive actions may be performed.

In an embodiment, event data may include a record of read accesses and/or write access to certain files, areas of persistent storage, and/or areas of memory. In an embodiment, event data may include a record of accesses to the registry of host operating system 210 and/or other repositories of settings of host operating system 210.

Certain embodiments may be configured to transmit such event data to central server 280 only in cases where the event data describes activity deemed sufficiently suspicious or malicious by threat model 260 as to exceed a specified threat level. In this way, central server 280 may be less likely to be inundated by event data received from a plurality of different computer systems.

Upon receipt of event data, central server 280 may analyze and review the received event data from a plurality of computer systems to ascertain if any patterns of use inconsistent with allowable behavior are ascertainable. To illustrate, central server 280 may comprise another instance of threat model 260, as represented by threat model 282 in FIG. 2. Threat model 282 may review and evaluate process behavior described by event data using the same considerations (for example, threat model 282 may serve as a backup or second check) as threat model 260 or may use a different set of considerations as threat model 260 (for example, threat model 282 may focus on patterns of misuse or malicious intent that might develop or be detectable across multiple computer systems).

Embodiments of the invention may also, in taking a responsive action in step 350, severe or terminate a network connection or secure network transport such as a Transport Layer Security (TLS) connection between host operating system 210 and end points on network 270, such as central server 280, if host operating system 210 is determined to possess one or more processes which are behaving inconsistently with a pattern of allowable behavior. This policy behind such action is to prevent any malware from propagating out of host operating system 210 if host operating system 210 is infected with malicious code. A second policy rationale for this responsive action is to help limit the resources which any user acting in an unauthorized manner can access.

Embodiments of the invention may also, in taking a responsive action in step 350, severe or terminate a network connection or secure network transport such as a Transport Layer Security (TLS) connection between protected environment 250 and end points on network 270, such as central server 280. This policy behind such action is to prevent any secrets used in encrypting event data prior to transmit to central server 280 are kept here safe from the host operating system 210 so as to prevent such secrets from being misappropriated from any malware in host operating system 210.

Embodiments of the invention may also, in taking a responsive action in step 350, encrypt and persistently store the event data. Certain embodiments may persistently store event data associated with one or more processes in a manner that evidences the attempt to persistently store the set of events regardless of whether or not the attempt is successful. As host operating systems may be involving in writing all data to a hard-disk drive, host operating system 210 may be involved in writing data to disk even if protected environment 250 is the initiator. However, if host operating system 210 is compromised by malware, there exists a possibility that host operating system 210 may, at the instruction of malware, fail to persistently store event data as doing so would evidence the malware infection. Thus, it is advantageous to be able to detect whether host operating system 210 is not persistently storing event data which host operating system 210 was instructed to store. To do so, threat model 260 may store information, such as a MAC code, which could evidence that event data was attempted to be persistently stored and which may be used to indicate whether any written event data was tampered with. If written event data was tampered with by malware, then the MAC codes for the event data would not match.

It is a possibility that if host operating system 210 were to be compromised by malicious code, host operating system 210 could be caused to malfunction or crash. Embodiments of the invention may, in taking a responsive action in step 350 directed to address this possibility, may establish protected environment 250 so that protected environment 250 has an opportunity to execute after a crash of host operating system 210, possibly for a limited time to perform a specific set of functions. Such specific set of functions may include ensuring that a log of information, such as event data describing recent activity which occurred in host operating system 210, was persistently stored or transmitted to central server 280. When the computer system subsequently reboots or is powered on, embodiments of the invention may retrieve certain information from a persistent storage to verify that event data describing recent activity which occurred in host operating system 210, was persistently stored or transmitted to central server 280. To do so, a message authentication code and a secure hash corresponding to a set of event data and an optionally MAC address of where the event data may be stored may be stored in a location at which host operating system 210 cannot tamper, such as locations in the BIOS such as the Trusted Platform Module (TPM), management engine (MA), or a UEFI firmware variable. While the entire set of event data could not be stored in the BIOS, a MAC address, message authentication code and a secure hash could be stored in such a location.

Embodiments of the invention may also, in taking a responsive action in step 350, may block certain suspicious activity at the file and/or network level. Embodiments of the invention may also, in taking a responsive action in step 350, may selectively deny the execution of one or more files and/or selectively deny access to one or more files. Embodiments may, based on how much a particular process has behaved inconsistently with a pattern of allowable behavior, may permit access to a file but deny execution of the same file.

In case of a crash or compromise of host operating system 210, monitor 220B may allow a remote restart of host operating system 210 and/or may enable the removal any software potentially compromised by malicious code and thereafter install software verified to be trustworthy or otherwise revert host operating system 210 to a prior state verified to be trustworthy.

Embodiments of the invention may also, in taking a responsive action in step 350, obtain portions of memory or data stored on disk for host operating system 210 for debugging, auditing, and/or problem solving purposes. Additionally, responsive actions taken in step 250 may include monitor 220 capturing still or moving videos of the screen displayed by host operating system 210. Further, responsive actions taken in step 250 may include monitor 220 recording when host operating system executes instructions at certain memory locations and potentially performing other monitoring actions when that occurs.

Certain embodiments may perform the steps of FIG. 3 against any operating system executing on computer system 240; thus, the description of FIG. 3 may equally apply to any operating system that is operating on computer system 240, including those other than host operating system 240. Further, embodiments may perform the steps of FIG. 3 against multiple operating systems executing concurrently on computer system 240.

Hardware Mechanisms

Figure 4:
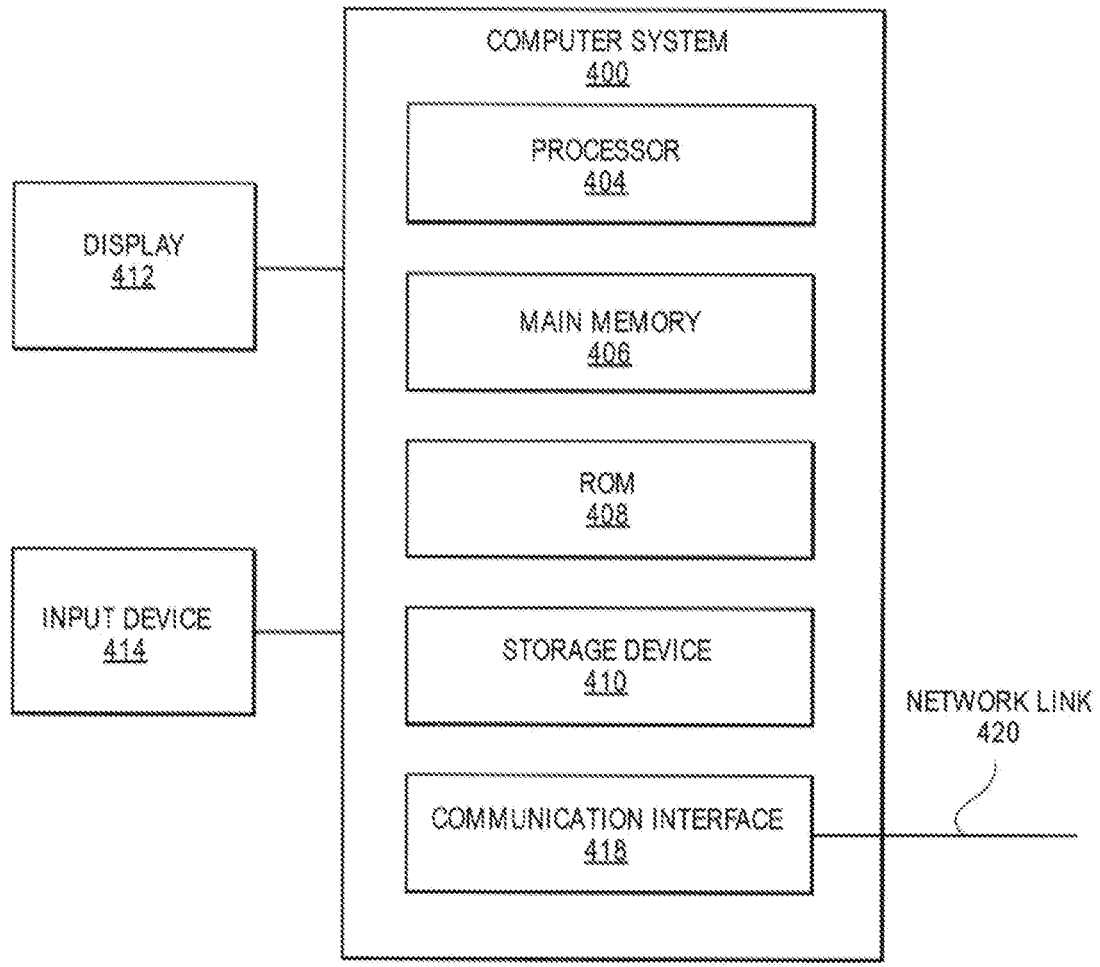
FIG. 4 is a block diagram that illustrates the hardware components of a computer system upon which an embodiment of the invention may be implemented.

Computer system 240 of FIG. 2 may be implemented on any type of computer system capable of executing a host operating system 210. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 404 for execution. Storage device 410 may correspond to a non-transitory machine-readable storage medium. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer readable medium comprising instructions when executed cause a processor of a computing device to:
   store and maintain a threat model in an isolated execution environment, the threat model identifies a pattern of allowable behavior for a process executing on a host operating process on a same machine as the isolated execution environment;
   observe behavior with the isolated execution environment of monitored processes including a particular process and processes in a monitoring circle relationship with the particular process, the monitoring circle relationship including a parent process to the particular process, any process in communication with a member of the monitoring circle relationship, and any process instantiated by a member of the monitoring circle relationship, the monitoring circle relationship observed by virtue of the monitoring circle relationship with the particular process;
   compare the observed behavior with the isolated execution environment of the monitored processes of the host operating system with the threat model within the isolated execution environment to identify allowable behavior for the monitored processes; and
   based on a determination of a monitored process with the isolated execution environment of the monitored processes having an observed behavior inconsistent with the allowable behavior, take action with the isolated execution environment.

2. The non-transitory computer readable medium of claim 1 wherein the host operating system and the isolated execution environment execute together on the computing device.

3. The non-transitory computer readable medium of claim 1 wherein the threat model is maintained on the computing device.

4. The non-transitory computer readable medium of claim 1 wherein the threat model executes within the host operating system.

5. The non-transitory computer readable medium of claim 1 wherein the any process in communication with a member of the monitoring circle relationship includes any process that interacts with a member of the monitoring circle relationship.

6. The non-transitory computer readable medium of claim 1 wherein the allowable behavior includes a pattern of allowable behavior.

7. The non-transitory computer readable medium of claim 1 wherein the threat model identifies the monitored process having the having the observed behavior inconsistent with the allowable behavior.

8. The non-transitory computer readable medium of claim 1 wherein the instructions when executed cause the processor of the computing device to compare observed behavior of the monitored processes include instructions when executed cause the processor to generate data that describes a set of events that is supplied to the threat model.

9. The non-transitory computer readable medium of claim 1 wherein the isolated execution environment includes a virtual machine, a container, or a sandbox or the isolated execution environment is implemented in an enclave.

10. A computing device, comprising:
    a processor; and
    a memory to store a host operating system and to store a threat model in an isolated execution environment, the memory including instructions when executed cause the processor to:
    store and maintain a threat model in an isolated execution environment;
    observe behavior of monitored processes including a particular process and processes in a monitoring circle relationship with the particular process, the monitoring circle relationship including a parent process to the particular process, any process in communication with a member of the monitoring circle relationship, and any process instantiated by a member of the monitoring circle relationship, the monitoring circle relationship observed by virtue of the monitoring circle relationship with the particular process;
    compare the observed behavior of the monitored processes of the host operating system with the threat model within the isolated execution environment to identify allowable behavior for the monitored processes; and
    based on a determination of a monitored process of the monitored processes having an observed behavior inconsistent with the allowable behavior, take action with the isolated execution environment.

11. The computing device of claim 10 wherein the processor executes the host operating system.

12. The computing device of claim 10 further comprising a network card coupled to the processor to communicate over a network, wherein the isolated execution environment communicates over the network via the host operating system.

13. The computing device of claim 12 wherein the action includes notifying a central server over the network.

14. The computing device of claim 10 further comprising a network card coupled to the processor to communicate over a network, wherein the observed behavior includes network activity.

15. The computing device of claim 10 further comprising a persistent storage device coupled to the processor, wherein the observed behavior includes accesses to files or areas of the persistent storage device.

16. The computing device of claim 15 wherein the action includes encrypting data that describes events related to behaviors and storing the encrypted data on the persistent storage device.

17. A method to monitor an executing host operating system, the method comprising:
    storing and maintaining a threat model in an isolated execution environment, the threat model identifies, for any process executing on a host operating system executing on a same machine as the isolated execution environment, a pattern of allowable behavior for the process;
    observing behavior with the isolated execution environment of monitored processes of the executing host operating system, the monitored processes including a particular process and processes in a monitoring circle relationship with the particular process, the monitoring circle relationship including a parent process to the particular process, any process in communication with a member of the monitoring circle relationship, and any process instantiated by a member of the monitoring circle relationship;
    comparing the observed behavior with the isolated execution environment of monitored processes of the host operating system with the threat model to identify allowable behavior for the monitored processes; and
    based on a determination of the isolated execution environment that a monitored process of the monitored processes having an observed behavior inconsistent with the allowable behavior, taking action responsive to the observed behavior inconsistent with the isolated execution environment.

18. The method of claim 17 wherein the host operating system executes on a computing device and the threat model is maintained on the computing device.

19. The method of claim 17 wherein the comparing includes correlating the observed behavior with a model of allowable behavior of executable code, interpreted data, and user action with the threat model.

20. The method of claim 17 wherein the observing behavior includes observing behavior via introspection.

\* \* \* \* \*